United States Patent [19]
Morioka et al.

[11] Patent Number: 5,386,403
[45] Date of Patent: Jan. 31, 1995

[54] SINGLE MOTOR DISK LOADING DEVICE WITH LOCK GEAR

[75] Inventors: Yukio Morioka, Katano; Toshihiro Kaneo, Shijonawate; Soichi Kimura, Katano, all of Japan

[73] Assignee: Matsushita Electric Industrial Co., Ltd., Osaka, Japan

[21] Appl. No.: 44,615

[22] Filed: Apr. 9, 1993

[30] Foreign Application Priority Data

Apr. 22, 1992 [JP] Japan ............................ 4-102610
Jan. 29, 1993 [JP] Japan ............................ 5-014009

[51] Int. Cl.6 .................. G11B 17/26; G11B 17/04
[52] U.S. Cl. .......................... 369/37; 369/77.1; 369/75.2; 360/98.06
[58] Field of Search .......... 369/36, 37, 75.2, 191, 369/192, 194, 77.1, 34; 360/98.04, 98.06

[56] References Cited

U.S. PATENT DOCUMENTS

| 4,755,978 | 7/1988 | Takizawa et al. | 369/37 |
| 5,123,005 | 6/1992 | Kurosu | 369/37 |
| 5,150,349 | 9/1992 | Takai et al. | 369/75.2 |
| 5,173,889 | 12/1992 | Nagahisa et al. | 369/37 |
| 5,218,592 | 6/1993 | Isshiki et al. | 369/36 |

Primary Examiner—Robert S. Tupper
Assistant Examiner—David L. Ometz
Attorney, Agent, or Firm—Stevens, Davis, Miller & Mosher

[57] ABSTRACT

This disk loading device is capable of reproducing a plurality of disks. A power transmission to drive gears is switched by tooth omission gears of a control gear so that angular movement of a disk playing portion, as well as movement of a tray base in a non-reproducing position and a reproducing position of the disk playing portion, can be effected by a single motor. A close lock gear, which prevents movement of the tray base in a disk reception stop positions, limits position of the drive gears. With this arrangement, when each tooth omission gear of the control gear enters the teeth of the corresponding drive gear, the interference of the teeth is eliminated. With this construction, the number of component parts such as a drive motor is reduced, thereby achieving a compact design and a stable operation.

12 Claims, 14 Drawing Sheets

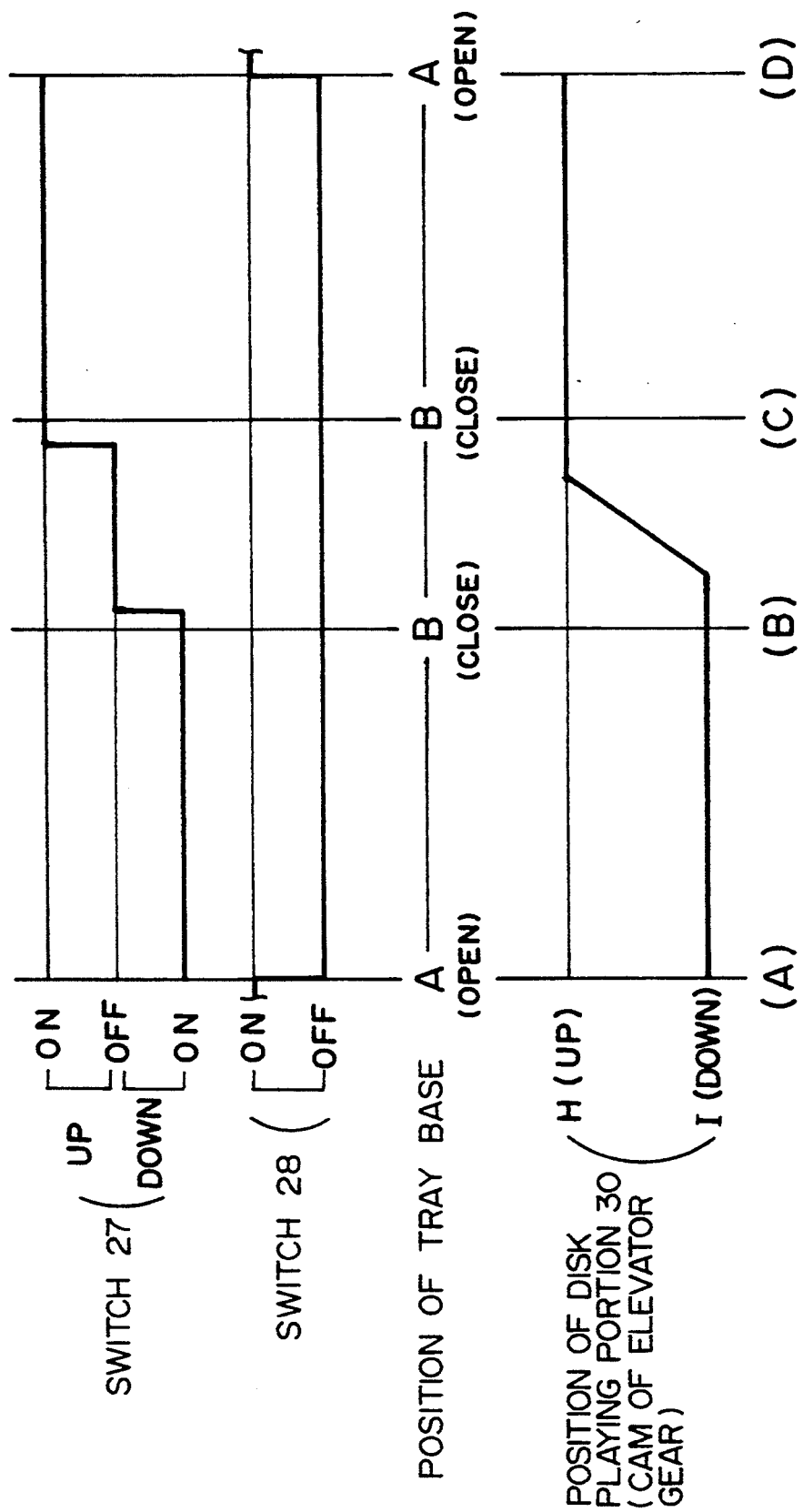

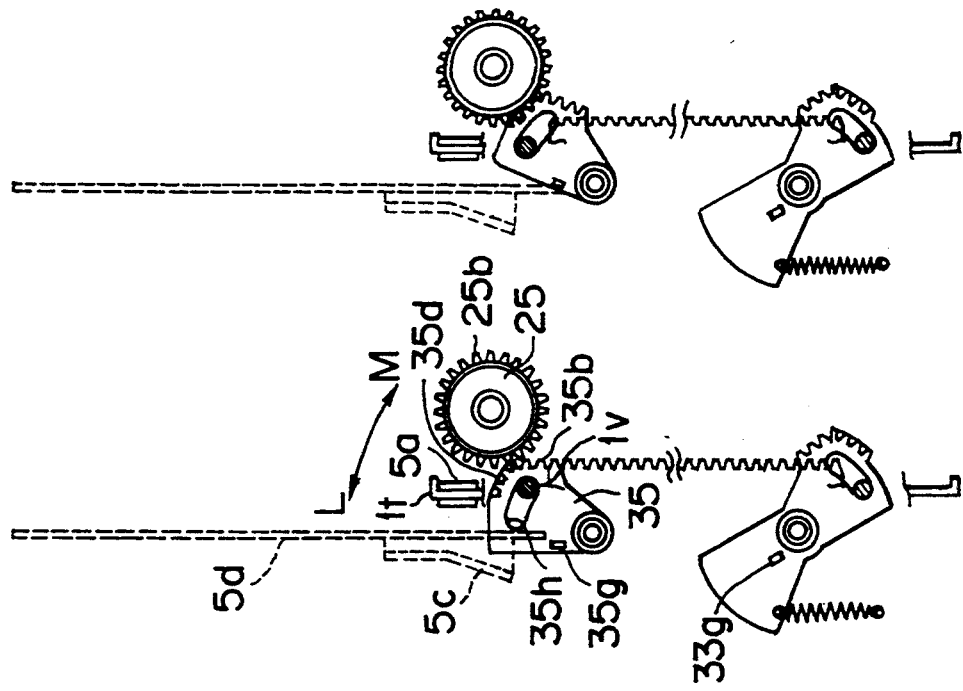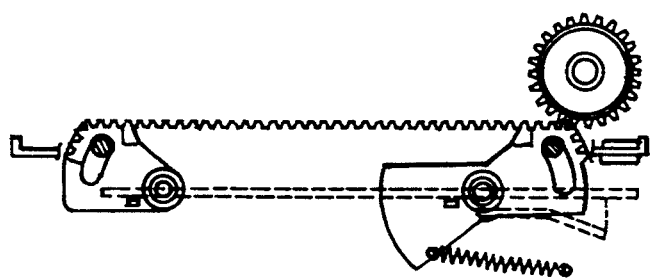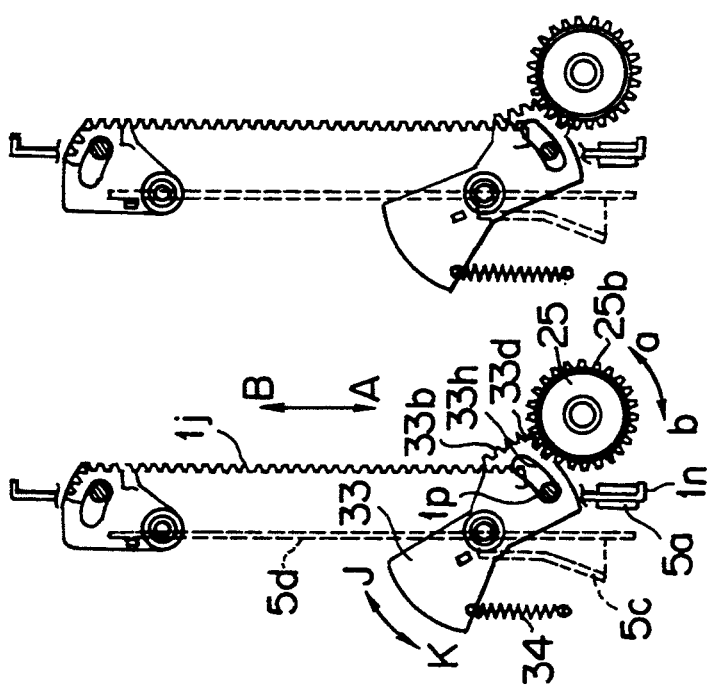

SINGLE MOTOR DISK LOADING DEVICE WITH LOCK GEAR

BACKGROUND OF THE INVENTION

This invention relates to a disk loading device for a disk player of the type which can be loaded with a plurality of disks, can continuously play the disks, and can play a desired one of the disks and a desired music track.

In recent years, a disk loading device, capable of being loaded with a plurality of disks for reproduction or playback, is of such a construction that even when one of the loaded disks is being reproduced, other loaded disks can be exchanged.

One such conventional disk loading device of the type described above will now be described with reference to the drawings.

FIG. 17 is an exploded, perspective view of a conventional disk loading device, FIG. 18 is a cross-sectional view taken along the line XVIII—XVIII of FIG. 17, and FIG. 19 is a cross-sectional view taken along the line IXX—IXX of FIG. 17.

In FIGS. 17 to 19, a tray base 50 is received in a hole 51a formed in a panel chassis 51, and right and left guide portions 50a on the tray base 50 are fitted respectively on right and left ribs 51b formed on the panel chassis 51, so that the tray base 50 is movable along the ribs 51b in directions indicated by arrows A and B. Right and left holder plates 52 are engaged respectively with opposite sides 50b of the tray base 50 to limit an upward movement of the tray base 50 (that is, to limit a vertical play), and are fixedly secured to the panel chassis 51.

As shown in FIG. 18, a rotary tray 53 has a rib 53c which is engaged with an outer periphery 54b of each of three rollers 54 each having a shaft portion 54a rotatably supported by a pawl 50c, a reception rib 50d and a hole 50i which are provided in the tray base 50. A hole 53d in the rotary tray 53 fits on a shaft 50e of the tray base 50, so that the rotary tray 53 is rotatable in directions indicated by arrows C and D. A notch 53b is formed in a central portion of each of five disk placing portions 53a. At this time, the roller 54 can not be seen through the notch 53b in the rotary tray 53 (see a portion designated at L1 in FIG. 18).

A motor 55 mounted on the tray base 50 drives the rotary tray 53 through a speed reduction mechanism which comprises a motor pulley 56, a belt 57, a worm pulley 58, a worm shaft 59 and a worm 60. More specifically, teeth 60a of the worm 60 drive a toothed portion 53e of the rotary tray 53 to rotate the rotary tray 53 in directions indicated by arrows C and D. As shown in FIG. 19, the worm 60, together with the worm pulley 58, is press fitted on the worm shaft 59, and the worm shaft 59 is rotatably mounted on bearing portions 50f on the tray base 50. Reference numeral 61 denotes a disk.

A motor 62 mounted on the panel chassis 51 drives the tray base 50 through a speed reduction mechanism which comprises a motor pulley 63, a belt 64, a pulley gear 65 and a drive gear 66. More specifically, a toothed portion 66a of the drive gear 66 drives a rack 50g, provided on the lower surface of the tray base 50, to move the tray base 50 in the directions of arrows A and B.

Referring to a disk playing portion 67, a turntable 67a is adapted to carry the disk 61 placed on the rotary tray 53, and a shaft 67b is mounted on support portions 51c on the panel chassis 51 so that the disk playing portion 67 can be pivotally moved in directions indicated by arrows E and F. A pin 67c is engaged with a cam portion 68a of an elevator gear 68, and the rotation of the elevator gear 68 causes the disk playing portion 67 to move in the directions of arrows E and F.

A motor 69 rotates the elevator gear 68 through a speed reduction mechanism which comprises a motor pulley 70, a belt 71 and a pulley gear 72.

A clamper 73 holds the disk 61 between it and the turntable 67a of the disk playing portion 67 which passes along the notch 53b in the rotary tray 53, the clamper 73 being rotatably mounted in a hole 74a formed through a clamp plate 74 mounted on the panel chassis 51. The tray base 50 has an opening 50h into which the disk playing portion 67 moves.

The operation of the above disk loading device will now be described. First, when an instruction is given for bringing the tray base 50 and the rotary tray 53 to the exterior of the panel chassis 52 (that is, into a disk attachment/detachment position) in order to place the disks 61 on the rotary tray 53, the motor 62 rotates and transmits its rotational force through the speed reduction mechanism which comprises the motor pulley 63, the belt 64, the pulley gear 65 and the drive gear 66, and therefore the toothed portion 66a of the drive gear 66 drives the rack 50g of the tray base 50 in the direction A, so that the tray base 50 moves in the direction A and stops at the disk attachment/detachment position, with the disk placing portions 53a of the rotary tray 53 disposed exteriorly of the panel chassis 51. Even at this time, the tray base 50 is held at its opposite sides 50b by the holder plates 52, and therefore its upward movement (that is, a vertical play) is limited.

Then, disks 61 are placed on the respective disk placing portions 53a of the rotary tray 53. In this embodiment, two disks 61 can be placed at a time. Then, when other disks are to be placed respectively on the other disk placing portions 53a, the motor 55 rotates in accordance with an instruction, and transmits its rotational force through the speed reduction mechanism which comprises the motor pulley 56, the belt 57, the worm pulley 58, the worm shaft 59 and the worm 60, and therefore the teeth 60a of the worm 60 drive the toothed portion 53e of the rotary tray 53 in the direction of arrows C-D, so that the rotary tray 53 is rotated together with the rollers 54 in the direction of arrows C-D from one disk placing portion 53a to the next one.

The rotary tray 53 is stopped with that disk placing portion 53a on which the disk 61 has not yet been placed is disposed exteriorly of the panel chassis 51, and another disk can be placed on that disk placing portion 53a. This operation is repeated so that the disks 61 can be placed on all of the disk placing portions 53a, respectively.

Then, when an instruction is given for playing the disk 61, the motor 62 rotates in a direction opposite to the above-mentioned direction, and therefore the tray base 50 also moves in a direction (i.e., the direction of arrow B) opposite to the above-mentioned direction and is stopped at a disk reception position where the tray base 50 is received within the panel chassis 51.

Then, the motor 55 rotates to move the disk 61 to be played to a playing position, so that the rotary tray 53 rotates toward the playing position in the direction of arrows C-D and stops when the designated disk 61 is brought into the playing position beneath the clamper 73. Then, the motor 69 rotates to rotate the elevator gear 68 through the speed reduction mechanism which comprises the motor pulley 70, the belt 71 and the pulley gear 72, so that the cam portion 68a of the elevator gear 68 moves the pin 67c of the disk playing portion 67, and therefore the disk playing portion 67 is pivotally moved in the direction of arrow E, so that the disk 61 is carried between the turntable 67a and the clamper 73, thereby starting the disk playing.

Then, when the playing is finished, the motor 69 rotates in the direction opposite to the above-mentioned direction in order to play the next disk 61, and therefore the disk playing portion 67 is pivotally moved in the direction of arrow F. Then, the rotary tray 53 is rotated in the direction of arrow C-D by the rotation of the motor 55 to move the next disk 61 into the playing position, and the disk playing portion 67 is pivotally moved in the direction of arrow E to play the disk 61, as described above. By repeating this operation, all of the disks 61 placed on the rotary tray 53 can be played.

Then, when the disk 61 is to be exchanged or taken out after the playing of this disk is finished, an instruction is given to rotate the motor 69 to pivotally move the disk playing portion 67 in the direction of arrow F, and then the tray base 50 is moved in the direction of arrow A by the rotation of the motor 62 to bring the disk 61, placed on the rotary tray 53, to the exterior of the panel chassis 51 (i.e., the disk attachment/detachment position). Then, the motor 55 is rotated in accordance with an instruction to rotate the rotary tray 53 so as to exchange or take out the disk 61.

When it is desired to exchange or take out another disk 61 while the disk 61 is played, an instruction is given to rotate the motor 62 to move the tray base 50 in the direction of arrow A, so that the disk 61 placed on the rotary tray 53 is brought to the exterior of the panel chassis 51 (i.e., the disk attachment/detachment position). Then, an instruction is given to rotate the motor 55 to rotate the rotary tray 53, and during this time, the disk or disks 61 other than the disk in the process of playing can be exchanged or taken out.

However, in the above conventional disk loading device, in order that another disk 61 can be exchanged or taken out during the time when one disk 61 is played, the three drive systems including the motors 55, 62 and 69, respectively, are needed, and therefore the number of the component parts is increased. This has been a barrier to a compact design of the disk loading device.

SUMMARY OF THE INVENTION

With the above problem of the prior art in view, it is an object of this invention to provide a disk loading device in which other disks can be exchanged or taken out while one disk is played, without increasing the number of motors as well as the number of drive systems thereof, thereby decreasing the number of component parts and achieving a compact design and a stable operation of the disk loading device.

According to the present invention, the movement of a disk playing portion between a reproducing position and a non-reproducing position, the movement of a tray base in a forward-backward direction in the non-reproducing position of the disk playing portion, and the movement of the tray base in the forward-backward direction in the reproducing position of the disk playing portion are effected by a single motor by switching the power transmission, using tooth omission gears each having teeth removed over a certain range. A lock gear for preventing the forward-backward movement of the tray base when the tray base is in the disk reception position is provided, and the lock gear having means for limiting the position of entry of the end tooth of the tooth omission gear into the teeth of its mating gear.

With this construction, the number of motors and the drive system thereof is not increased, and another disk can be exchanged or taken out while one disk is played, and the number of the component parts is small, and a compact design is achieved, and the operation is stabilized.

BRIEF DESCRIPTION OF THE DRAWINGS

FIG. 14 is a timing chart of the mechanism block in the disk loading device;

FIGS. 15A to 15E are views showing the operation of the close lock gear and the open lock gear in the disk loading device;

DESCRIPTION OF THE PREFERRED EMBODIMENTS

A preferred embodiment of a disk loading device of the present invention will now be described in detail with reference to FIGS. 1 to 16.

Figure 1:
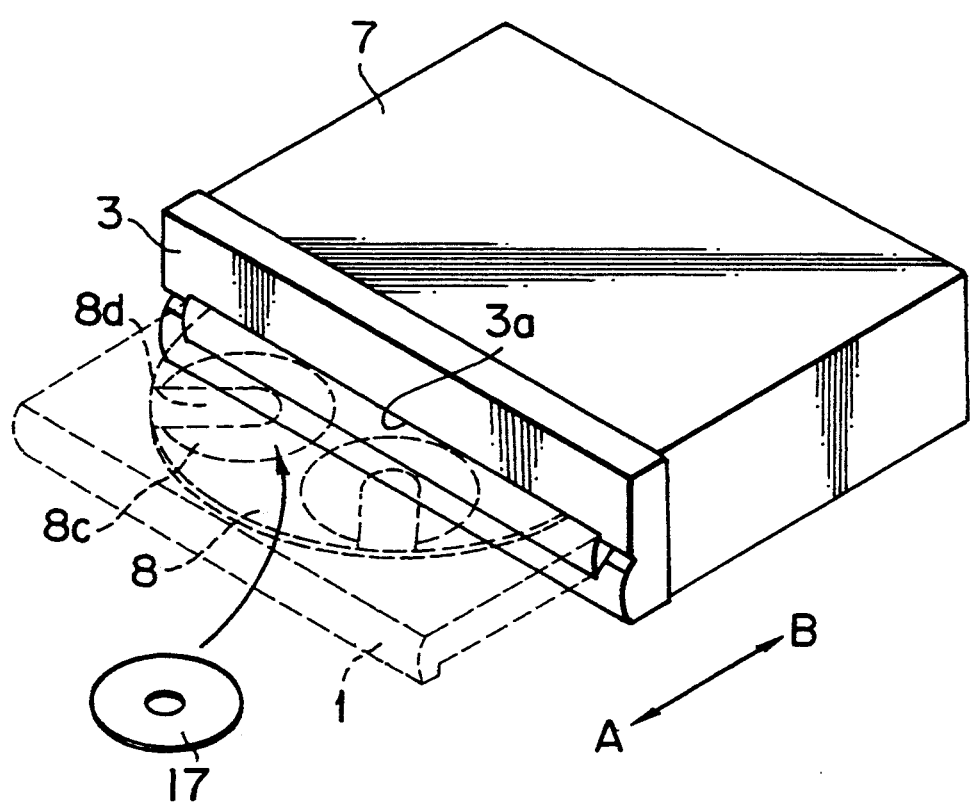
FIG. 1 is a perspective view of a first embodiment of a disk loading device of the present invention.
Figure 2:
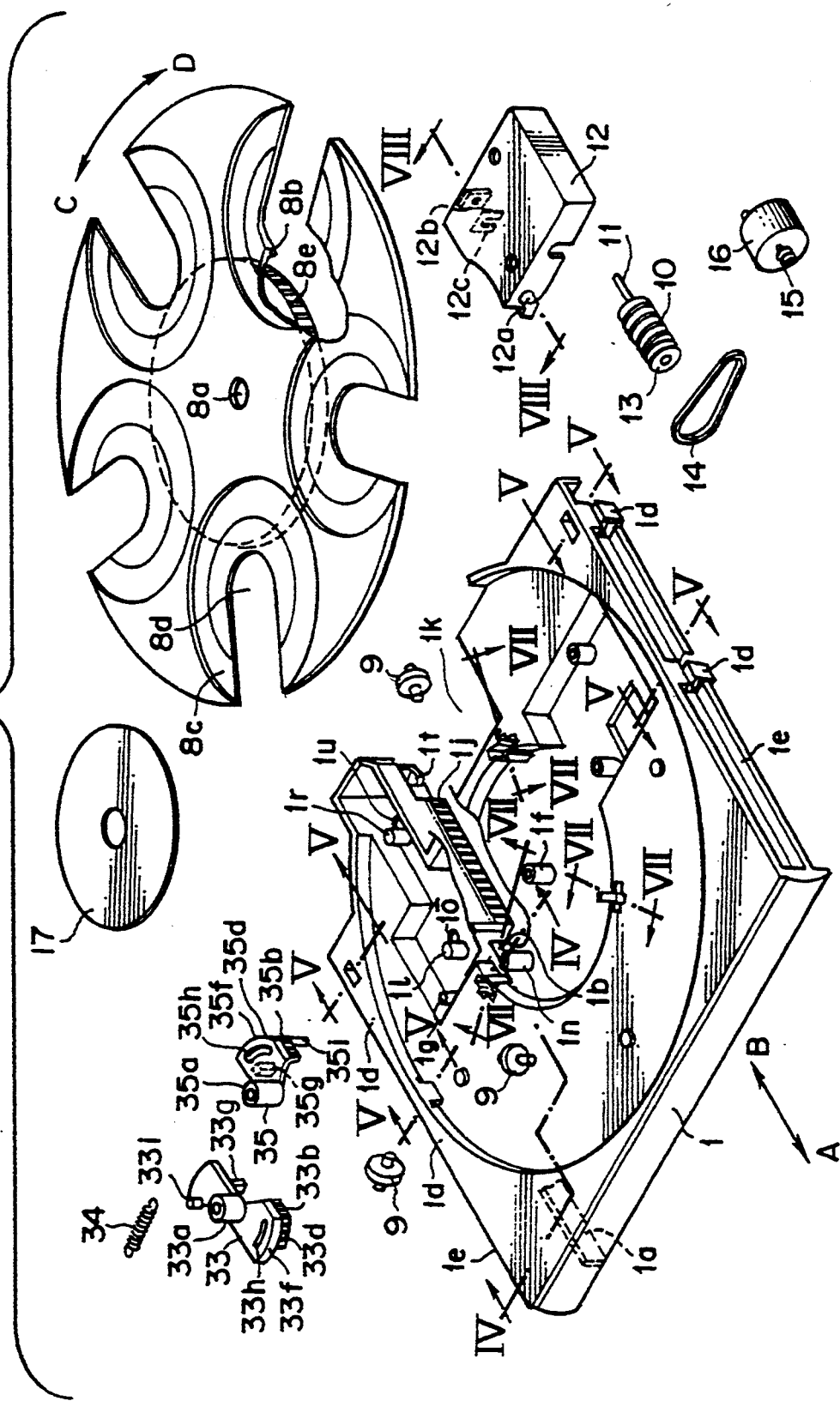
FIG. 2 is an exploded, perspective view of those portions of the disk loading device which are movable in directions of arrows A and B.
Figure 3:
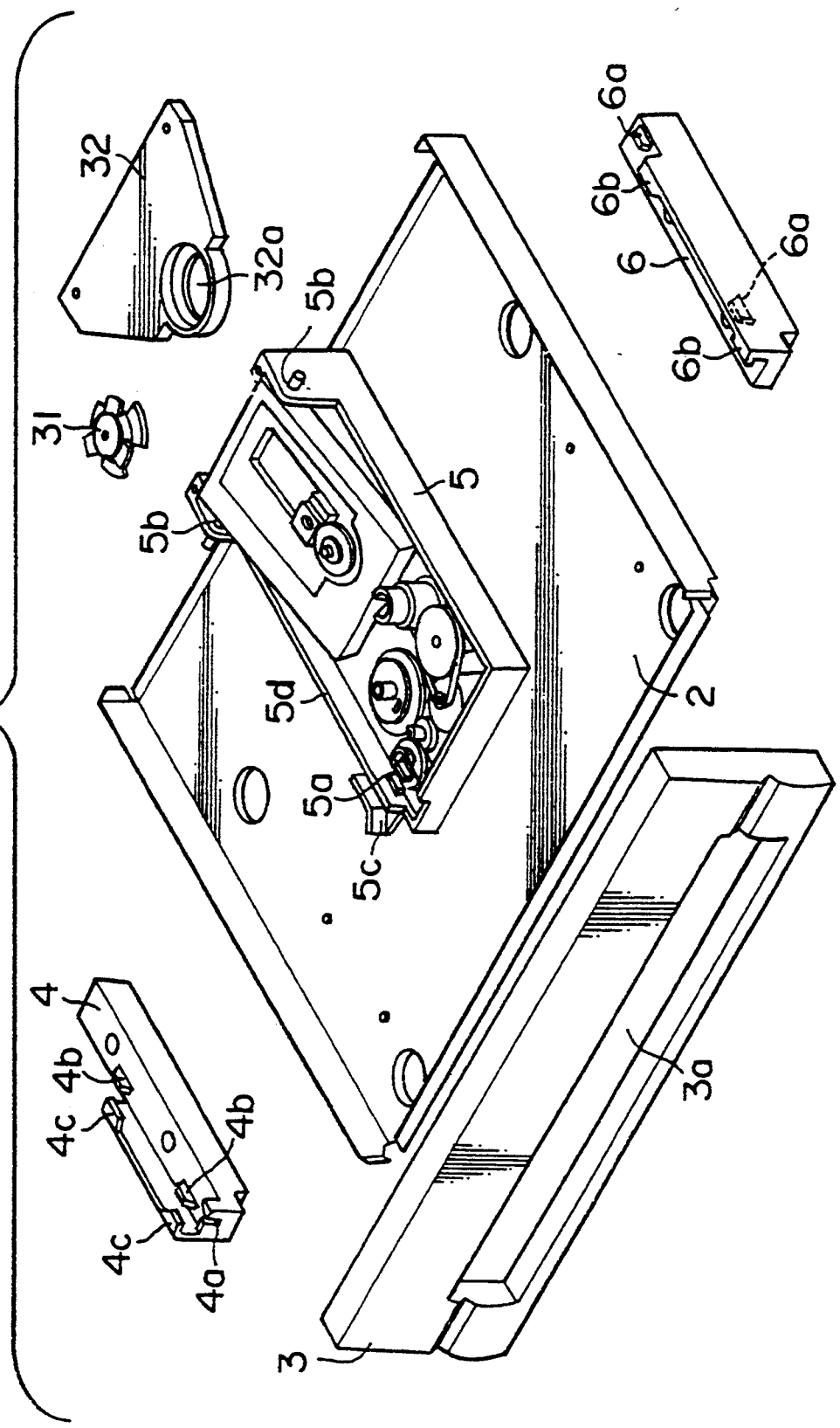
FIG. 3 is an exploded, perspective view of those portions of the disk loading device which are not movable in the directions of arrows A and B.
Figure 4:
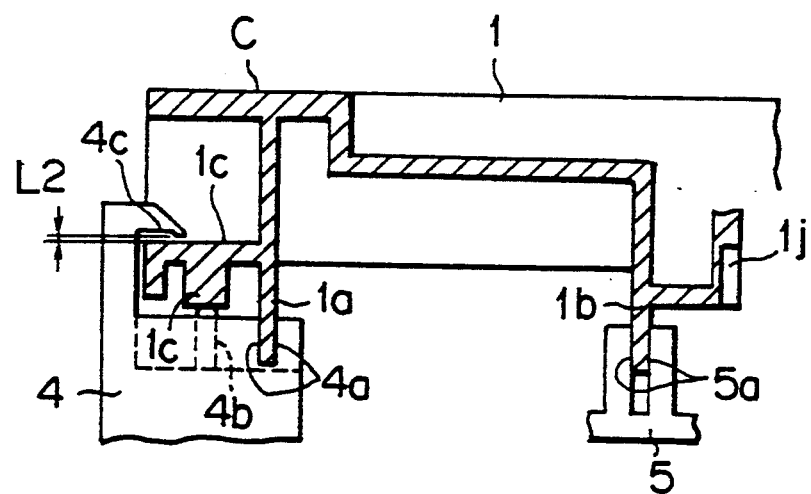
FIG. 4 is a cross-sectional view taken along the line IV—IV of FIG. 2.
Figure 5:
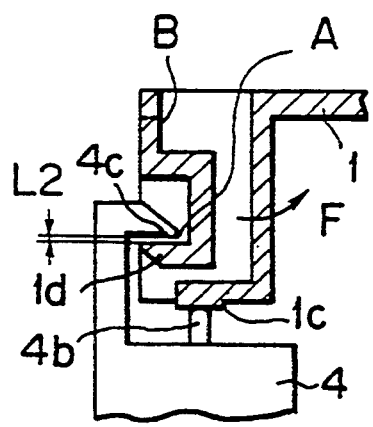
FIG. 5 is a cross-sectional view taken along the line V—V of FIG. 2.

In FIGS. 1 to 15E, a tray base 1 is received in a hole 3a formed through a panel 3 fixedly secured to a chassis 2. As shown in FIGS. 4 and 5, with respect to a right-and-left direction of the tray base 1, ribs 1a and 1b of the tray base 1 are engaged with a slide portion 4a of a guide 4 and a slide portion 5a of a mechanism base 5, respectively, and with respect to a vertical direction of the tray base 1, left and right reception portions 1c of the tray base 1 are engaged respectively with ribs 4b of the guide 4 and a rib 6a of a guide 6 by the weight of the tray base 1. In this condition, the tray base 1 is movable in directions of arrows A and B. At this time, pawls 1d (which are provided two at each of the right and left sides) of the tray base 1, as well as right and left side portions 1e of the tray base 1, are spaced slightly (as at L2 in FIGS. 4 and 5) from a flange 4c of the guide 4 and a flange 6b of the guide 6, and with this arrangement, the upward movement of the tray base 1 is limited.

The rib 1a of the tray base 1 coincides with the vertical wall of the side portion 1e so as to prevent a sink from developing on an outer surface designated at C in FIG. 4.

For attaching the tray base 1, the pawls 1d of the tray base 1 are disposed in registry with the flanges 4c of the guide 4 and the flanges 6b of the guide 6b, respectively (FIG. 6A), and the tray base 1 is pushed in a direction of arrow E, so that the pawls 1d of the tray base 1 are flexed in a direction of arrow F (FIG. 5), thereby attaching the tray base 1. The above guides 4 and 6 are fixedly mounted on the chassis 2. Reference numeral 7 denotes a casing.

Figure 7:
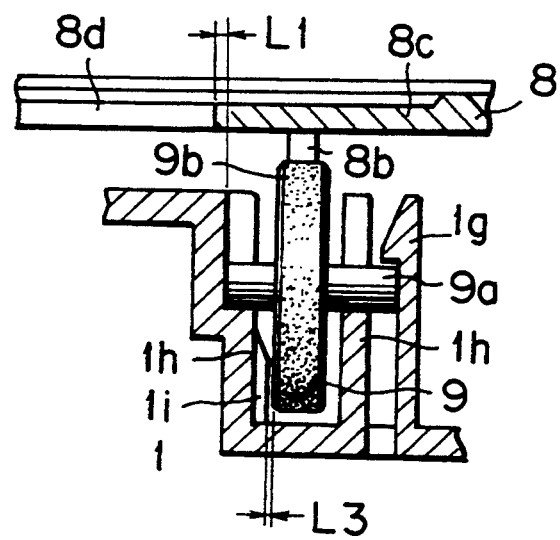
FIG. 7 is a cross-sectional view taken along the line VII—VII of FIG. 2.

A rotary tray 8 has a hole 8a fitted on a shaft 1f of the tray base 1, and has a rib 8b which is engaged with an outer periphery 9b of each of three rollers 9 having a shaft 9a rotatably supported by a pawl 1g and reception ribs 1h of the tray base 1, as shown in FIG. 7. With this arrangement, the rotary tray 8 is rotatable in directions of arrows C and D. A notch 8d is formed in a central portion of each of five disk placing portions 8c. At this time, the shaft 9a of the roller 9 and the pawl 1g and reception ribs 1h can not be seen through the notch 8d (see a portion designated at L1 in FIG. 7). A rib 1i serves to prevent the disengagement of the roller 9, and is provided in slightly spaced relation to the side of the outer peripheral portion 9b of the roller 9, as indicated by a gap L3 in FIG. 7.

Figure 8:
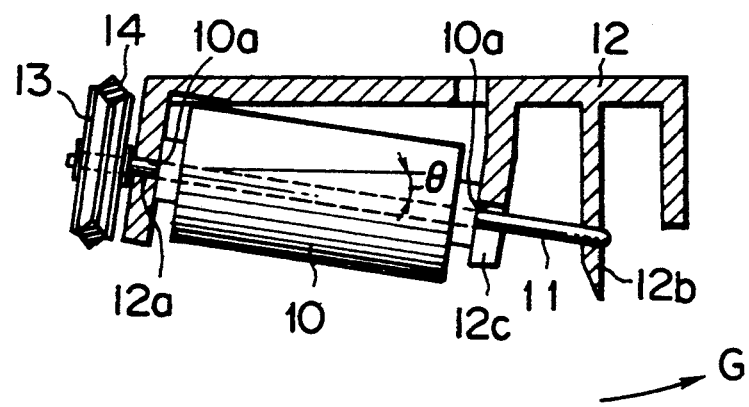
FIG. 8 is a cross-sectional view taken along the line VIII—VIII of FIG. 2.

A worm 10 is meshed with a spur gear 8e of the rotary tray 8 so as to rotate the rotary tray 8 in the directions of arrows C and D. A worm shaft 11 is press fitted in the central portion of the worm 10, and is rotatably supported by a J-shaped groove 12a and a bearing portion 12b of a worm base 12 fixedly mounted on the tray base 1, as shown in FIG. 8. The worm shaft 11 is inclined at an angle corresponding to a lead angle 8 of the worm 10. Thrust surfaces 10a of the worm 10 are engaged with the side surface of the J-shaped groove 12a and a side surface of a U-shaped rib 12c of the worm base 12, respectively, thereby limiting the amount of thrust. The bearing portion 12b can be flexed in a direction of arrow G when the worm shaft 11 is inserted therethrough.

A worm pulley 13 is press fitted at its central portion on the worm shaft 11, and is connected via a belt 14 and a motor pulley 15 to a motor 16 mounted on the worm base 12. By engaging the belt 14 on the worm pulley 13 and the motor pulley 15, the worm shaft 11 is held in a predetermined portion (i.e., a tip portion of the J-shape) of the J-shaped groove 12a in the worm base 12. Reference numeral 17 denotes a disk.

Figure 9:
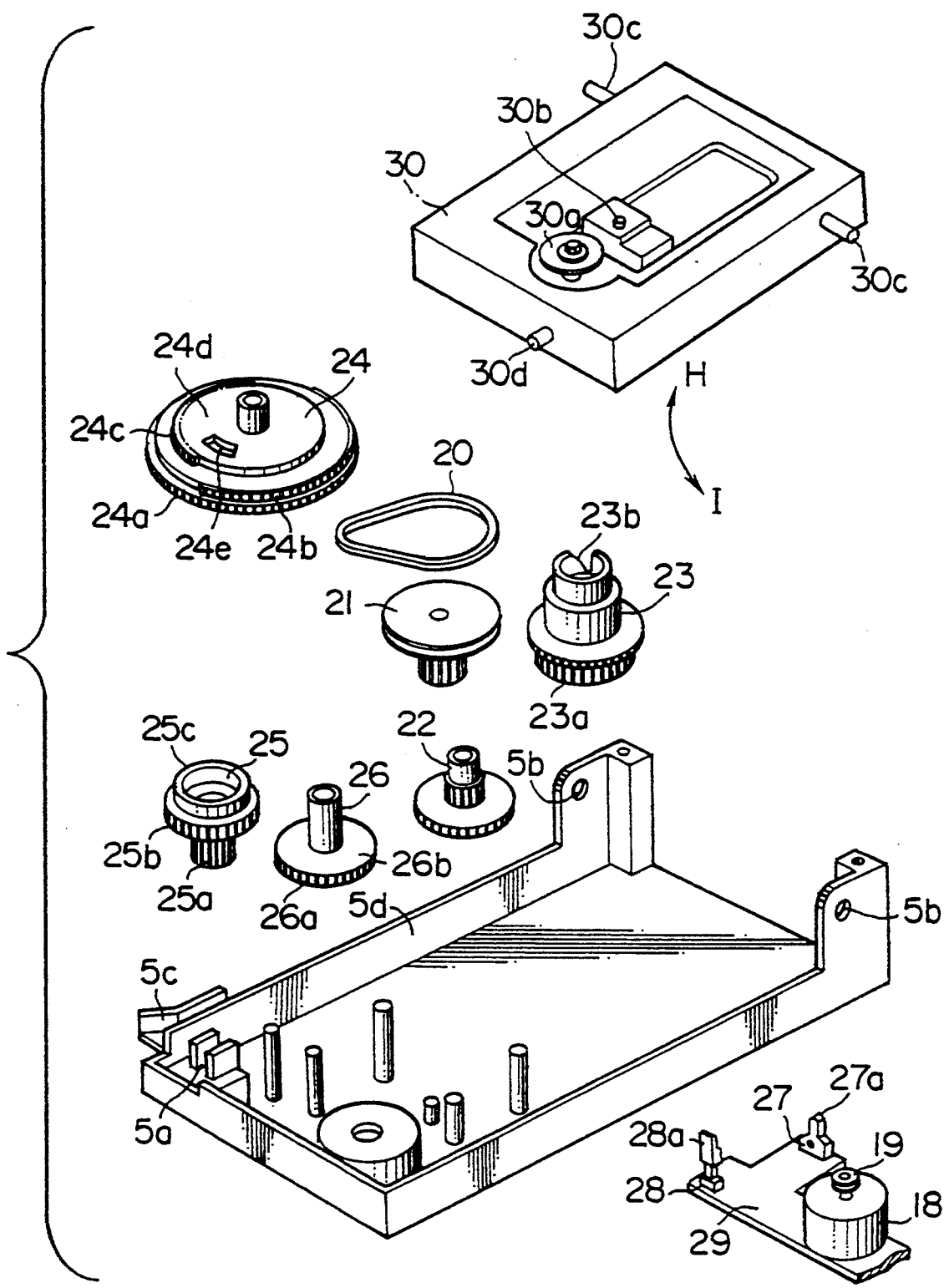
FIG. 9 is an exploded, perspective view of a mechanism block of the disk loading device.

Referring to a mechanism block shown in FIG. 9, a motor 18 mounted on the mechanism base 5 drives an elevator gear 23 through a speed reduction mechanism which comprises a motor pulley 19, a belt 20, a pulley gear 21 and a speed reduction gear 22, and further teeth 23a of the elevator gear 23 drive gear teeth 24a of a control gear 24 to rotate the control gear 24. The control gear 24 has tooth omission gears 24b and 24c each having its teeth removed over a certain range. The tooth omission gear 24b is adapted to be meshed with teeth 25a of a drive gear 25, and the tooth omission gear 24c is adapted to be meshed with teeth 26a of a drive gear 26. Also, the teeth 25a of the drive gear 25 and the teeth 26a of the drive gear 26 are adapted to be meshed with each other. Teeth 25b of the drive gear 25a are meshed with a rack 1j of the tray base 1 so as to move the tray base 1 in the directions of arrows A and B. The above gears are rotatably mounted on the mechanism base 5.

Designated at 27 is a position detection switch for the control gear 24, and this switch is operated when a knob 27a is engaged with an upper surface 24d and a hole 24e of the control gear 24.

Designated at 28 is a position detection switch for the tray base 1, and this switch is fixedly mounted, together with the switch 27 and the motor 18, on a base 29 which is provided for connection purposes.

A disk playing portion 30 has a turntable 30a which carries the disk 17 placed on the rotary tray 8, and rotates together therewith. An optical pickup 30b reads signals from the disk 17, and a shaft 30c of the disk playing portion 30 is supported on support portions 5b of the mechanism base 5 to allow a pivotal movement of the disk playing portion 30 in directions of arrows H and I. A pin 30d is engaged with a cam portion 23b of the elevator gear 23, and the rotation of the elevator gear 23 causes the disk playing portion 30 to pivotally move in the directions of arrows H and I.

A clamper 31 holds the disk 17 between it and the turntable 30a of the disk playing portion 30 which passes along the notch 8d in the rotary tray 8, the clamper 31 being rotatably mounted in a hole 32a formed through a clamp plate 32 fixedly mounted on the mechanism base 5. The tray base 1 has an opening 1k into which the disk playing portion 30 moves.

Figure 10:
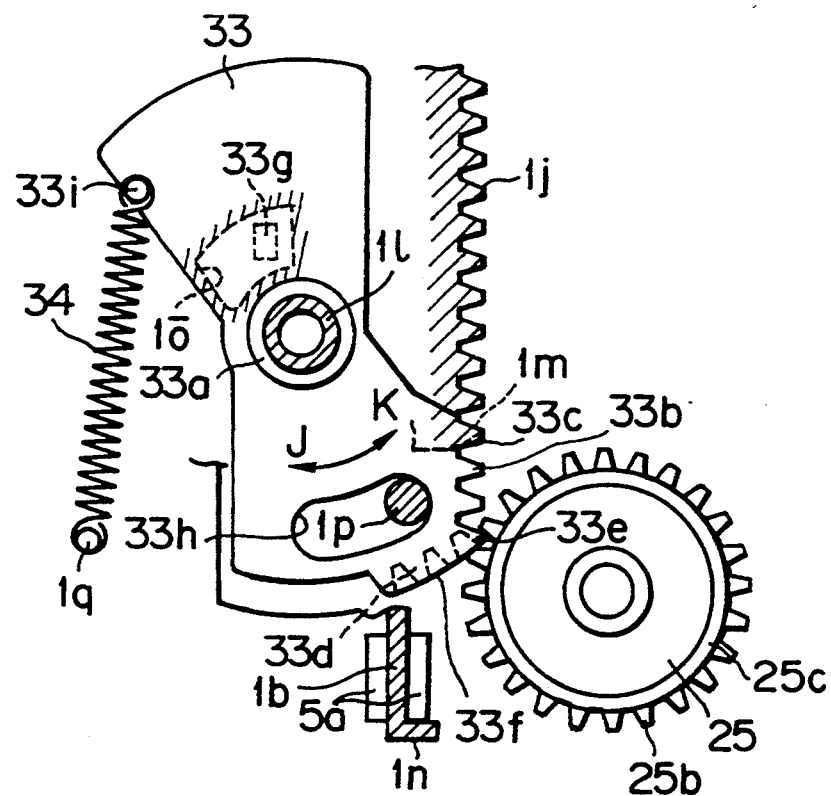
FIG. 10 is a detailed view of a close lock gear in the disk loading device.

A close lock gear 33 is angularly movably mounted at its boss 33a on a shaft 1 of the tray base 1, and as shown in FIG. 10, a rack portion 33b is formed as an extension of the rack 1j of the tray base 1, and an end tooth 33c of the rack portion 33b overlaps an end tooth 1m of the rack 1j of the tray base 1 in a plane. One side of the end tooth 1m of the rack 1j is cut as illustrated. A gear 33d is provided on a circle having its center disposed at the boss 33a, and this gear 33d is meshed with the teeth 25b of the drive gear 25 immediately after the rack portion 33b is disengaged from the teeth 25b, and with this arrangement, when the movement of the tray base 1 in the direction of arrows A and B by the rotation of the drive gear 25 is finished, the close lock gear 33 is angularly moved in a direction of arrows J and K. Therefore, a corner tooth 33e is of such a shape as obtained by combining the rack portion 33b and the gear 33d together. An arcuate rib 33f is provided on a circle having its center on the boss 33a, and when the close lock gear 33 is angularly moved in the direction of arrows J and K, the arcuate rib 33f is brought into contact with a ring-shaped rib 25c concentric with the teeth 25b of the drive gear 25, and the arcuate rib 33f cooperates with a stopper 1n of the tray base 1 (which is at this time in contact with the front end of the slide portion 5a of the mechanism base 5) to properly keep the pitch of meshing between the gear 33d of the close lock gear 33 and the teeth 25b of the drive gear 25. A square pin 33g passes through a hole 1o in the tray base 1, and extends downwardly, and is engaged with a rib 5c of the mechanism base 5 so as to angularly move the close lock gear 33 in the direction of arrow J. Designated at 33h is a rotation prevention slot extending in the direction of arrows J and K, and a pin 1p of the tray base 1 abuts against the end of this slot. Designated at 33i is a spring retainer, and a spring 34 is extended between this spring retainer and a spring retainer 1q of the tray base 1 to urge the close lock gear 33 to angularly move in the direction of arrow K.

Figure 11:
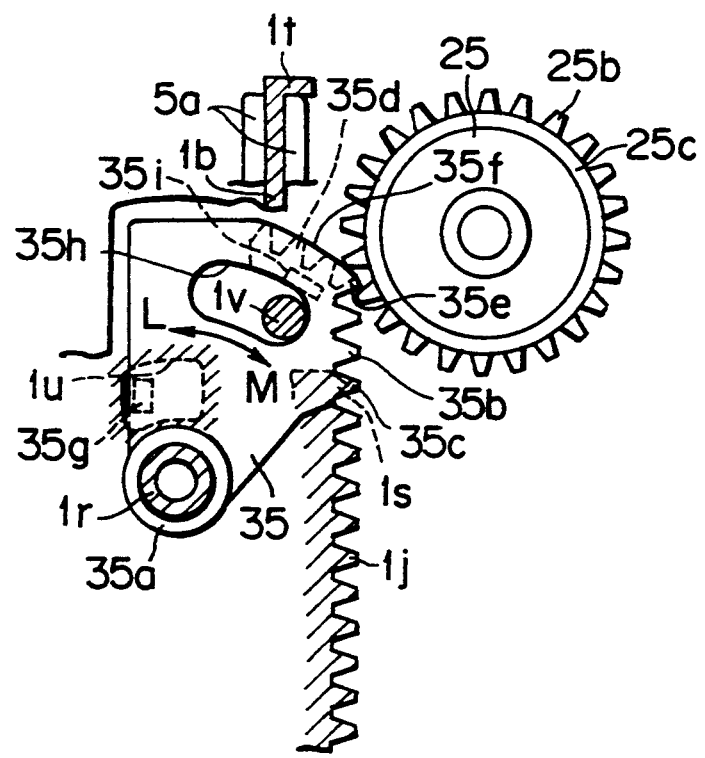
FIG. 11 is a detailed view of an open lock gear in the disk loading device.

An open lock gear 35 is angularly movably mounted at its boss 35a on a shaft 1r of the tray base 1, and as shown in FIG. 11, a rack portion 35b is formed as an extension of the rack 1j of the tray base 1, and an end tooth 35c of the rack portion 35b overlaps an end tooth 1s of the rack 1j of the tray base 1 in a plane. One side of the end tooth 1s of the rack 1j is cut as illustrated. A gear 35d is provided on a circle having its center disposed on the boss 35a, and is meshed with the teeth 25b of the drive gear 25 immediately after the rack portion 35b is disengaged from the teeth 25b, and with this arrangement, when the movement of the tray base 1 in the direction of arrows A and B by the rotation of the drive gear 25 is finished, the open lock gear 35 is angularly moved in directions of arrows L and M. Therefore, a corner tooth 35e is of such a shape as obtained by combining the rack portion 35b and the gear 35d together. An arcuate rib 35f is provided on a circle having its center on the boss 35a, and when the open lock gear 35 is angularly moved in the direction of arrows L and M, the arcuate rib 35f is brought into contact with the ring-shaped rib 25c concentric with the teeth 25b of the drive gear 25, and the arcuate rib 35f cooperates with a stopper 1t of the tray base 1 (which is at this time in contact with the rear end of the slide portion 5a of the mechanism base 5) to properly keep the pitch of meshing between the gear 35d of the open lock gear 35 and the teeth 25b of the drive gear 25. A square pin 35g passes through a hole 1u in the tray base 1, and extends downwardly, and is engaged with the rib 5d of the mechanism base 5 to prevent the open lock gear 35 from angular movement in the direction of arrow M. Designated at 35h is a rotation prevention slot extending in the direction of arrows L and M, and a pin 1v of the tray base 1 abuts against the end of this slot. A rib 35i extends downwardly, and when the open lock gear 35 angularly moves in the direction of arrow M, this rib 35i is engaged with a knob 28a of the switch 28 of the mechanism block to operate it.

Figure 12:
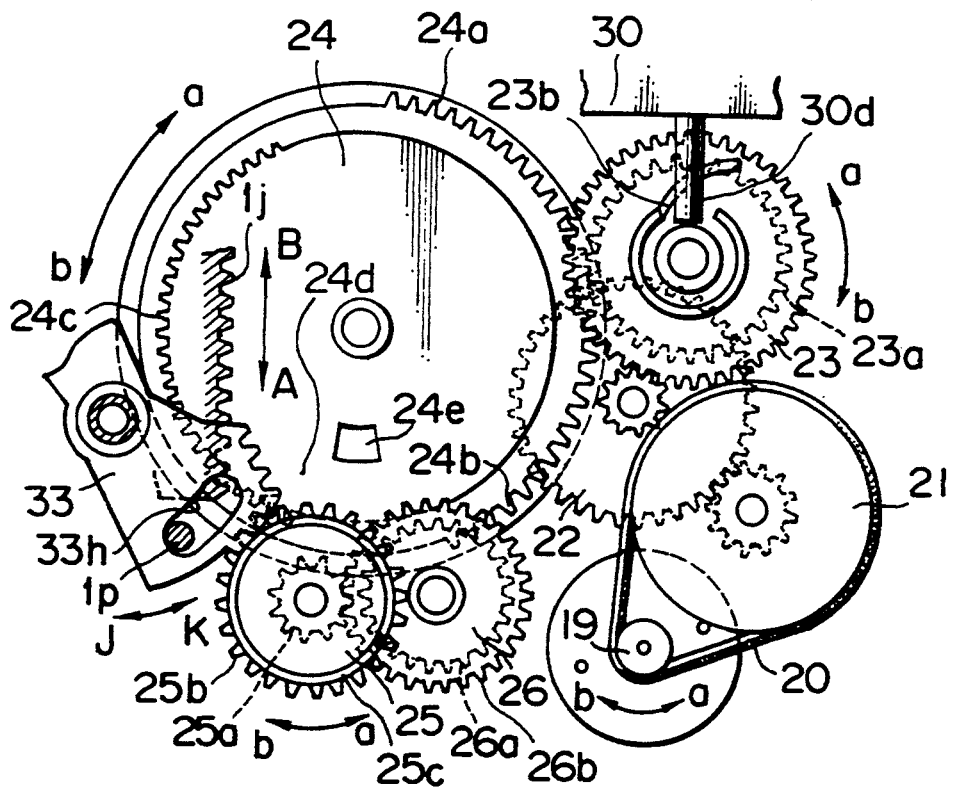
FIG. 12 a view showing the operation of the mechanism block in the disk loading device.
Figure 13:
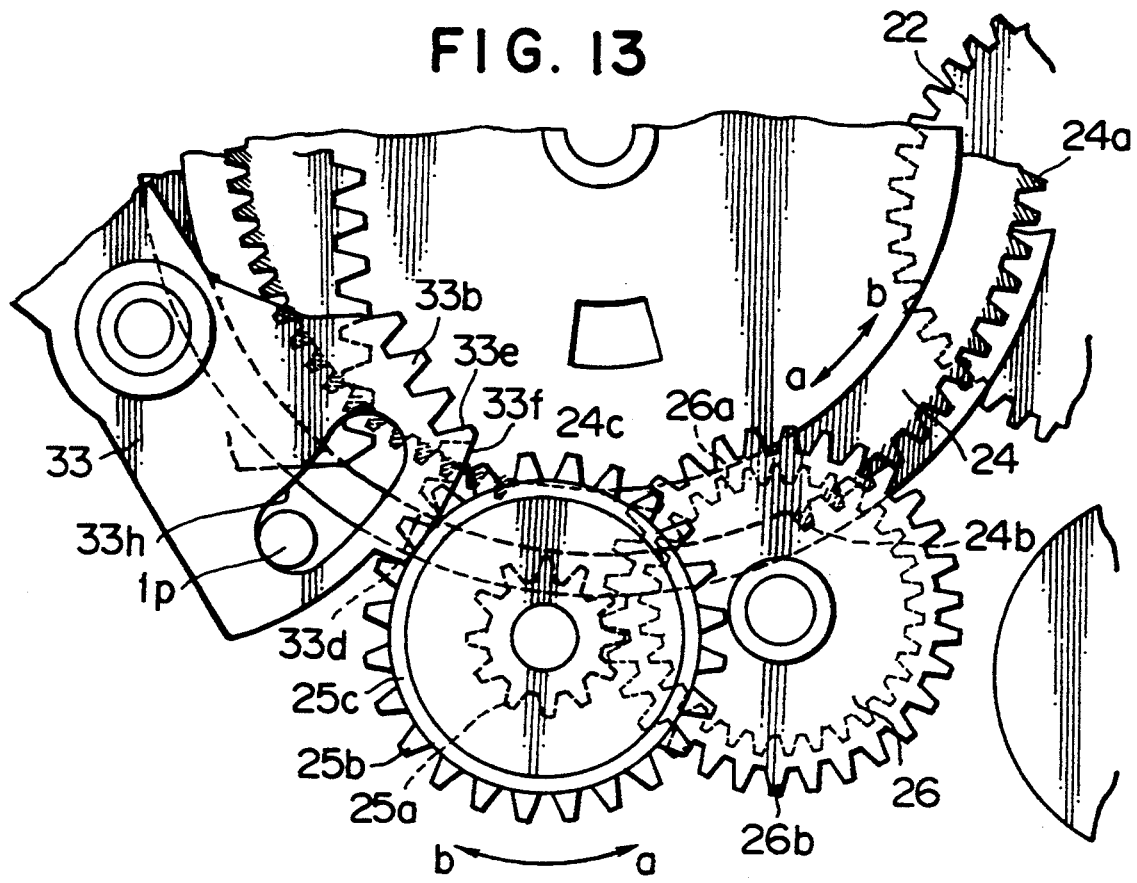
FIG. 13 is a detailed view of a portion of the mechanism block shown in FIG. 12.

The operation of the above disk loading device will now be described. First, in order to place disks 17 on the rotary tray 8, when an instruction is given for bringing the tray base 1 and the rotary tray 8 to the exterior (i.e., a disk attachment/detachment position) of the panel 3 from the initial condition (FIGS. 6C and 15A; (B) in FIG. 14), the motor 18 rotates in a direction of arrow a as shown in FIGS. 12 and 13 to drive the elevator gear 23 in the direction a through the speed reduction mechanism which comprises the motor pulley 19, the belt 20, the pulley gear 21 and the reduction gear 22. As a result, the control gear also rotates in the direction a, and the tooth omission gear 24b begins to be meshed with the teeth 25a of the drive gear 25, so that the drive gear 25 rotates in the direction a.

Therefore, the close lock gear 33 angularly moves in the direction J from the condition of FIG. 15A, and is brought into the condition of FIG. 15C through the condition of FIG. 15B, and the end of the slot 33h in the close lock gear 33 abuts against the pin 1p of the tray base 1, thereby stopping the angular movement in the direction J. As a result, the rack portion 33b of the close lock gear 33 and the rack 1j of the tray base 1 are disposed on a common line, and the drive of the drive gear 25 in the direction a shifts from the gear 33d to the rack 33b, and therefore the tray base 1 is then moved in the direction A.

The square pin 35g is engaged with the rib 5b of the mechanism base 5 to limit the angular movement of the open lock gear 35 in the direction M, and the rack portion 35b of the open lock gear 35 and the rack 1j of the tray base 1 are disposed on a common line, and then the rack portion 35b is meshed with the teeth 25b of the drive gear 25 as shown in FIG. 15D.

At this time, one side of the end tooth 1s of the rack 1j of the tray base 1 is cut as illustrated, and therefore even if the open lock gear 35 is slightly angularly moved in the direction M, so that the planar overlapping relation between the end tooth 1s of the rack 1j of the tray base 1 and the end tooth 35c of the rack portion 35b of the open lock gear 35 is slightly improper, the meshing with the teeth 25b of the drive gear 25 is not affected.

Then, the stopper 1t of the tray base 1 abuts against the rear end of the slide portion, so that the movement of the tray base 1 in the direction A is finished, and the engagement of the square pin 35g of the open lock gear 35 with the rib 5b of the mechanism base 5 is released, and the drive of the drive gear 25 in the direction a shifts from the rack portion 35b to the gear 35d, so that the open lock gear 35 angularly moves in the direction M, and the end of the slot 35h abuts against the pin 1v of the tray base 1, as shown in FIG. 15E. As a result, the rib 35i of the open lock gear 35 pushes the knob 28a of the switch 28 to turn it on, so that the motor 18 is stopped.

Figure 6A:
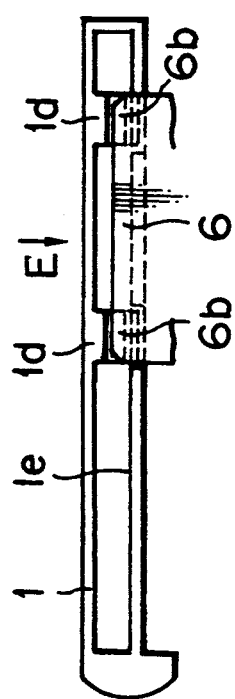
FIGS. 6A, 6B and 6C are views showing the movement of a tray base of the disk loading device.
Figure 6B:
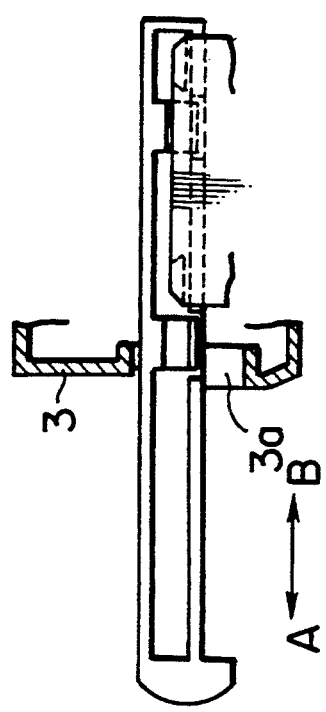

This condition is a disk attachment/detachment position, and is shown in FIGS. 6B and 15E and indicated by (A) in FIG. 14. At this time, as shown in FIG. 6B, the pawls 1d of the tray base 1 which detract from the appearance are completely received within the panel 3, and is concealed from an external view. Also, at this time, the flange 4c of the guide 4 and the flange 6b of the guide 6 cooperate not with the relatively weak pawls 1d but with the side portions 1e of a sufficient strength to limit the upward movement of the tray base 1. Further, the open lock gear 35 and the drive gear 25 lock the tray base 1 against movement in the direction B even if an external force is applied to the tray base.

Then, disks 17 are placed on the disk placing portions 8c of the rotary tray 8 (in this embodiment, two disks can be placed at a time). When other disks 17 are to be placed on the remaining disk placing portions 8c of the rotary tray 8, respectively, an instruction is given to rotate the motor 16, and the worm 10 drives the spur gear 8e of the rotary tray 8 in the direction C-D through the speed reduction mechanism which comprises the motor pulley 15, the belt 14 and the worm pulley 13. As a result, the rotary tray 8 rotates together with the rollers 9 in the direction C-D from one disk placing portion 8c to the next one 8c, and the disk placing portion 8c on which the disk 17 has not yet been placed is stopped exteriorly of the panel 3, and the next disk 17 is placed on it. By repeating this procedure, the disks 17 can be placed on all of the disk placing portions 8c of the rotary tray 8, respectively.

At this time, the roller 9, the pawl 1g and the reception rib 1h of the tray base 1 can not be seen through the notch 8d of the rotary tray from the exterior. And besides, even if a force due, for example, to drop during the transportation is applied, the side surface of the outer peripheral portion of each roller 9 is engaged with the rib 1i, and therefore the roller will not be disengaged from the tray base 1.

Then, when an instruction is given for bringing the tray base 1 and the rotary tray 8 into the inside of the panel 3 (that is, into a disk reception position), the motor 18 is rotated in the direction b opposite to the above-mentioned direction, and therefore the elevator gear 23, the control gear 24 and the drive gear 25 also rotate in the reverse direction, that is, in the direction b.

As a result, the open lock gear 35 angularly moves in the direction L from the position of FIG. 15E to the position of FIG. 15D, and the end of the slot 35h abuts against the pin 1v of the tray base 1 to stop the angular movement in the direction L. Also, the rack portion 35b of the open lock gear 35 and the rack 1j of the tray base 1 are disposed on a common line, and the drive of the drive gear 25 in the direction b shifts from the gear 35d to the rack portion 35b, so that the tray base 1 then moves in the direction B. As a result, the square pin 35g of the open lock gear 35 engages the rib 5d of the mechanism base 5, so that the angular movement of the open lock gear 35 in the direction M is limited.

Then, when the tray base 1 further moves in the direction B, the square pin 33g of the close lock gear 33 is brought into engagement with the rib 5c of the mechanism base 5, so that the close lock gear 33 angularly moves in the direction J, and the rack portion 33b of the close lock gear 33 and the rack 1j of the tray base 1 are brought into a common line, and then the rack portion 33b is brought into meshing engagement with the teeth 25b of the drive gear 25, as shown in FIG. 15C.

At this time, one side of the end tooth 1m of the rack 1j of the tray base 1 is cut as illustrated, and therefore even if the close lock gear 33 is slightly angularly moved in the direction K, so that the planar overlapping relation between the end tooth 1m of the rack 1j of the tray base 1 and the end tooth 33c of the rack portion 33b of the close lock gear 33 is slightly improper, the meshing with the teeth 25b of the drive gear 25 is not affected.

Then, the stopper 1n of the tray base 1 abuts against the front end of the slide portion 5a of the mechanism base 5, so that the movement of the tray base 1 in the direction B is finished, and the drive of the drive gear 25 in the direction b shifts from the rack portion 33b to the gear 33d, so that the close lock gear 33 angularly moves in the direction K into the position shown in FIG. 15B.

As a result, the tooth omission gear 24b of the control gear 24 is brought out of mesh with the teeth 25a of the drive gear 25, so that the drive gear 25 ceases to be driven, whereas the control gears 24 continue to rotate in the direction b, and the hole 24e in the control gear 24 becomes engaged with the knob 27a of the switch 27 to turn off the down side of the switch 27. As a result, the control gear rotates in the reverse direction, that is, in the direction a, and when the down side of the switch 27 is again turned on (as indicated by (B) in FIG. 14), the motor 18 is stopped, and therefore the rotation of the control gear 24 is also stopped.

Figure 6C:
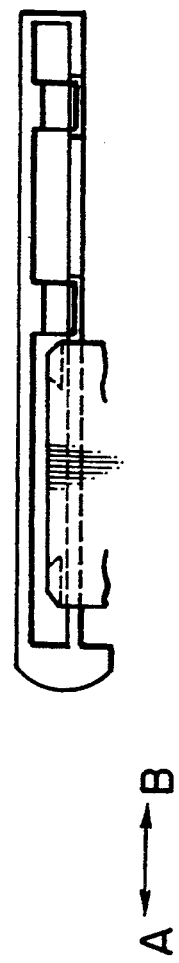

On the other hand, after the tooth omission gear 24b of the control gear 24 is out of mesh with the teeth 25a of the drive gear 25, the close lock gear 33, together with the undriven drive gear 25, further angularly moves in the direction K under the influence of the spring 34, so that the end of the slot 33h abuts against the pin 1p of the tray base 1, as shown in FIG. 15A. This condition is the initial condition (also the disk reception position) which is shown in FIGS. 6C and 15A and is indicated (B) in FIG. 14.

At this time, the stopper in of the tray base 1 abuts against the front end of the slide portion 5a of the mechanism base 5, and the arcuate rib 33f of the close lock gear 33 is in contact with the ring-shaped rib 25c of the drive gear 25. By doing so, the pitch of meshing between the gear 33d of the close lock gear 33 and the teeth 25b of the drive gear 25 is kept proper, and therefore even with a small urging force of the spring 34, the angular movement of the close lock gear 33 in the direction K can be finished. The close lock gear 33 and the drive gear 25 lock the tray base 1 against movement in the direction A even if a force due, for example, to drop during the transportation is applied. In addition, as shown in FIG. 6C, the flange 4c of the guide 4 and the flange 6b of the guide 6 cooperate not with the relatively weak pawls 1d but with the side portions 1e of a sufficient strength to limit the upward movement of the tray base 1.

Even if the tray base 1 is kept stopped at the position of FIG. 6A as a result, for example, of a power supply failure during the movement of the tray base 1 in the direction A–B, and if an external force is applied to the tray base 1, the tray base 1 will not angularly move in the direction F since a force applying point A is disposed inwardly of a supporting point B as shown in FIG. 5. Therefore, the pawls 1d of the tray base 1 and the flanges 4c and 6b of the guides 4 and 6 will not fail to limit the upward movement of the tray base 1.

Then, when an instruction is given for playing the disk 17, the motor 18 first rotates in the direction b from the condition indicated by (B) in FIG. 14, as shown in FIGS. 12 and 13, so that the elevator gear 23 and the control gear 24 also rotate in the direction b. As a result, the pin 30d of the disk playing portion 30 engaged with the cam portion 23b of the elevator gear 23 moves, and the disk playing portion 30 pivotally moves in the direction H to hold the disk 17 between the turntable 30a and the clamper 31. Then, the engagement of the knob 27a of the switch 27 for the control gear 24 shifts from the hole 24e to the upper surface 24d, and the up side of the switch 27 is turned on to stop the motor 18, so that the rotation of the elevator gear 23 and the control gear 24 is also stopped. This condition is indicated by (C) in FIG. 14. Then, the playing of the disk 17 is started.

When the disk playing is finished, the motor 18 rotates in the direction b opposite to the above-mentioned direction from the condition of (C) in FIG. 14 in order to play the next disk 17. Therefore, the elevator gear 23 and the control gear 24 also rotate in the direction a, and the disk playing portion 30 is pivotally moved in the direction I. Then, the engagement of the knob 27a of the switch 27 for the control gear 24 shifts from the hole 24e to the opposite upper surface 24d, so that the down side of the switch 27 is turned on to stop the motor 18. Therefore, the rotation of the elevator gear 23 and the control gear 24 is also stopped. This condition is indicated by (B) in FIG. 14.

Then, the rotary tray 8 is rotated in the direction C–D by the rotation of the motor 16, and when the next disk 17 moves into a position (the disk playing position) beneath the clamper 31, the motor 18 rotates in the direction b as described above. As a result, the disk playing portion 30 is pivotally moved in the direction H into the condition of (C) in FIG. 14, and the disk 17 is played. By repeating this procedure, all of the disks 17 placed on the rotary tray 8 can be played.

Then, when another disk is to be exchanged or taken out during the playing of one disk 17, that is, in the condition of (C) in FIG. 14, an instruction is given to rotate the motor 18 in the direction b, so that the elevator gear 23 and the control gear 24 also rotate in the direction b. As a result, the tooth omission gear 24c of the control gear 24 begins to be meshed with the teeth 26a of the drive gear 26, so that the teeth 26b of the drive gear 26 drive the teeth 25a of the drive gear 25, and therefore the drive gear 25 rotates in the direction a.

Then, as described above, the tray base 1 moves in the direction A from the position of FIG. 15A via the positions of FIGS. 15B, 15C and 15D to the position of FIG. 15E, that is, the disk attachment/detachment position indicated by the condition of (D) in FIG. 14. Then, an instruction is given to rotate the motor 16 to rotate the rotary tray 8 in the direction C-D, so that the disk 17, other than the disk 17 which is in the process of playing, can be exchanged or taken out.

Then, after the disk 17 is exchanged or taken out, an instruction is given for bringing the tray base 1 and the rotary tray 8 into the inside (i.e., the disk reception position) of the panel 3. The motor 18 first rotates in the direction a opposite to the above-mentioned direction, so that the elevator gear 23, the control gear 24 and the drive gear 25 also rotate in the direction a opposite to the above-mentioned direction.

Then, as described above, the tray base 1 moves in the direction B from the position of FIG. 15E via the positions of FIGS. 15D and 15C to the position of FIG. 15B, so that the tooth omission gear 24c of the control gear 24 is brought out of mesh with the teeth 26a of the drive gear 26, and therefore the drive gear 25 ceases to be driven whereas the control gear 24 continues to rotate in the direction a, and the hole 24e of the control gear 24 is engaged with the knob 27a of the switch 27 to turn off the up side of the switch 27. As a result, the control gear rotates in the reverse direction b, and when the up side of the switch 27 is again turned on (that is, in the condition of (C) in FIG. 14), the motor 18 is stopped, so that the rotation of the control gear 24 is also stopped.

On the other hand, after the tooth omission gear 24c of the control gear 24 is out of mesh with the teeth 26a of the control gear 26, the close lock gear 33 further angularly moves, together with the undriven drive gears 25 and 26, in the direction K under the influence of the spring 34 as described above, and the end of the slot 33h abuts against the pin 1p of the tray base 1 as shown FIG. 15A. Thus, the tray base 1 is located at the disk reception position indicated by FIGS. 6C and 15A and the condition of (C) in FIG. 14.

Thus, the close lock gear 33 is angularly moved in the direction K by the urging force of the spring 34, and is necessarily stopped at the position of FIG. 15A where the end of the slot 33h abuts against the pin 1p of the tray base 1. Therefore, the positions of stop of the meshed drive gears 25 and 26 are limited or defined, and therefore as shown in FIG. 13, the entry of the tooth omission gear 24b of the control gear 24 into the teeth 25a of the drive gear 25, as well as the entry of the tooth omission gear 24c of the control gear 24 into the teeth 26a of the drive gear 26, can be effected without any interference of the teeth.

Then, when an instruction for recovering the initial condition is given after the playing of the disk 17 is finished, the motor 18 first rotates in the direction a as described above, so that the elevator gear 23 and the control gear 24 also rotate in the direction a, and the disk playing portion 30 is pivotally moved in the direction I. Then, the engagement of the knob 27a of the switch 27 for the control gear 24 shifts from the hole 24e to the opposite upper surface 24, so that the down side of the switch 27 is turned on to stop the motor 18. Therefore, the rotation of the elevator gear 23 and the control gear 24 is also stopped to obtain the condition of (B) in FIG. 14. Thus, the initial condition as shown in FIGS. 6C and 15A and indicated by (B) in FIG. 14 is obtained.

As described above, in this embodiment, the power transmission to the drive gear 25 or 26 is switched by the tooth omission gears 24b and 24c provided on the control gear 24, and by doing so, the pivotal movement of the disk playing portion 30 in the direction H-I between the reproducing (playback position) and the non-reproducing position, the movement of the tray base 1 in the direction A-B in the non-reproducing position of the disk playing portion 30, and the movement of the tray base 1 in the direction A-B in the reproducing position of the disk playing portion 30 are effected by the single motor 18. And besides, the close lock gear 33 prevents the movement of the tray base 1 in the direction A-B when the tray base 1 is in the disk reception position, and the positions of stop of the drive gears 25 and 26 are limited or specified by the close lock gear 33. By doing so, when the tooth omission gear 24b of the control gear 24 enters the teeth 25a of the drive gear 25 and when the tooth omission gear 24c of the control gear 24 enters the teeth 26a of the drive gear 26, the interference of the teeth can be eliminated.

The arcuate rib 33f of the close lock gear 33 abuts against the ring-shaped rib 25c of the drive gear 25 to properly keep the pitch of meshing between the gear 33d of the close lock gear 33 and the teeth 25b of the drive gear 25. Therefore, even with a small urging force of the spring 34, the close lock gear 33 can necessarily be angularly moved in the direction of K to the position of FIG. 15A where the end of the slot 33h abuts against the pin 1p of the tray base 1.

Further, the one side of the end tooth 1m of the rack 1j of the tray base 1 is cut as illustrated, and therefore even if the close lock gear 33 is slightly angularly moved in the direction K, so that the planar overlapping relation between the end tooth 1m of the rack 1j of the tray base 1 and the end tooth 33c of the rack portion 33b is slightly improper, the meshing with the teeth 25b of the drive gear 25 is not affected. Similarly, one side of the end tooth 1s of the rack 1j of the tray base 1 is cut as illustrated, and therefore even if the open lock gear 35 is slightly angularly moved in the direction M, so that the planar overlapping relation between the end tooth 1s of the rack 1j of the tray base 1 and the end tooth 35c of the rack portion 35b of the open lock gear 35 is slightly improper, the meshing with the teeth 25b of the drive gear 25 is not affected.

Next, a second embodiment of the present invention will now be described in detail with reference to FIGS. 16A and 16B.

Figure 16A:
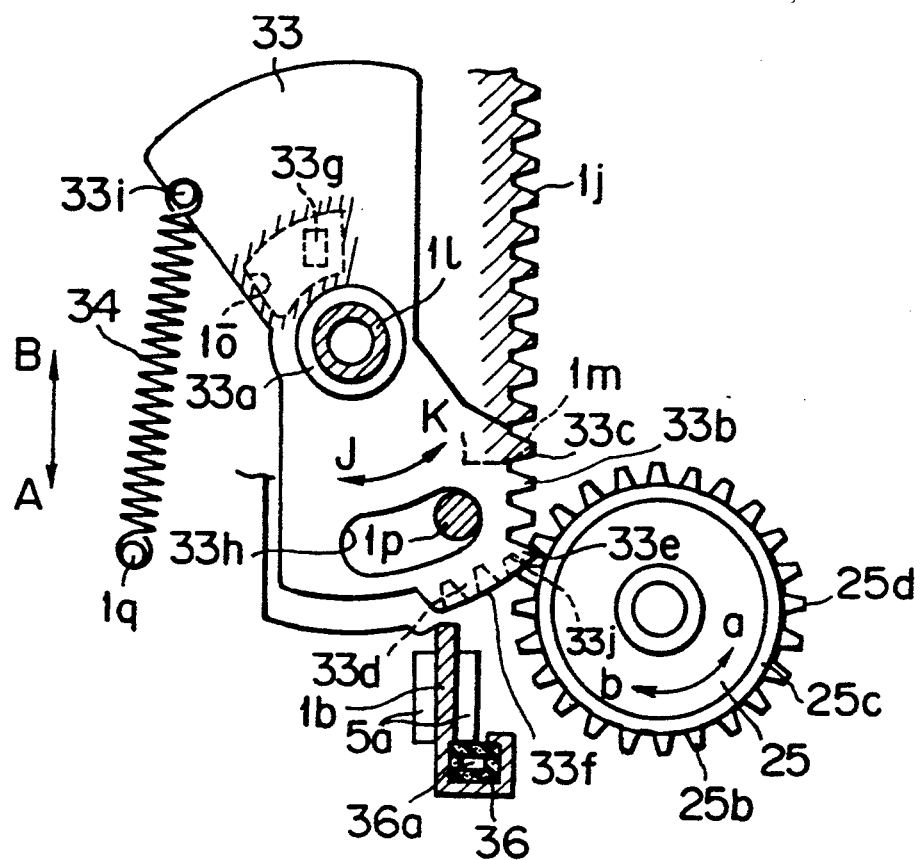
FIGS. 16A and 16B are detailed views of a close lock gear in a second embodiment of a disk loading device of the present invention.
Figure 16B:
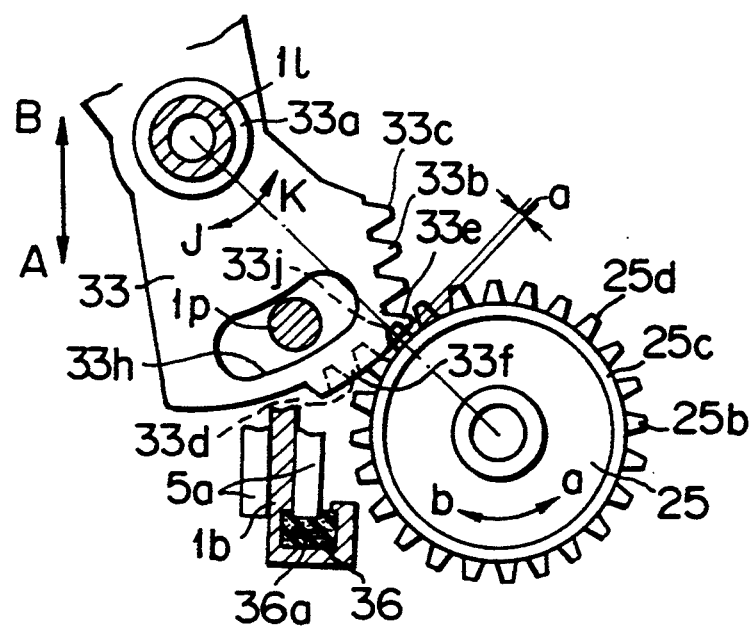
Figure 17:
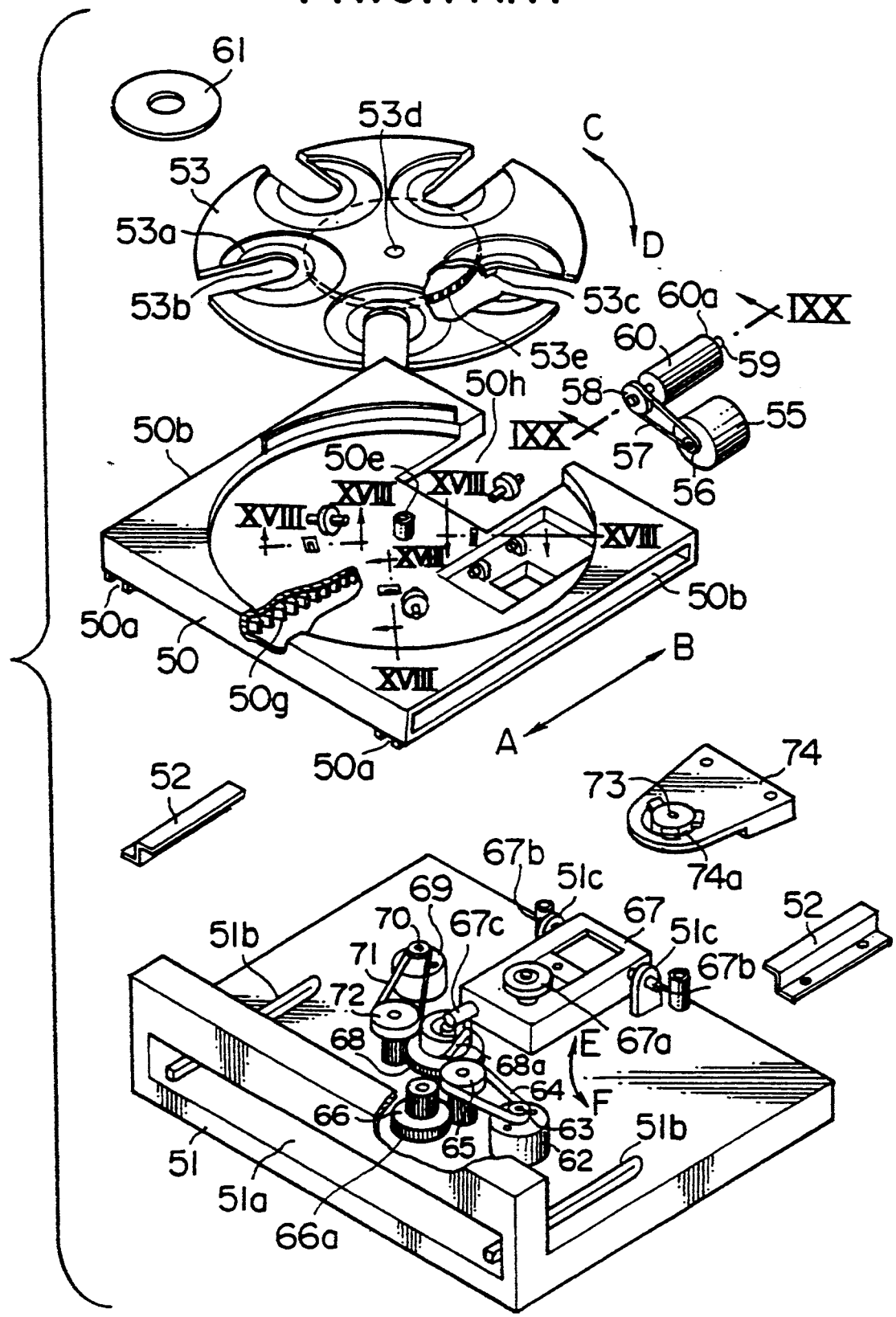
FIG. 17 is an exploded, perspective view of the conventional disk loading device.
Figure 18:
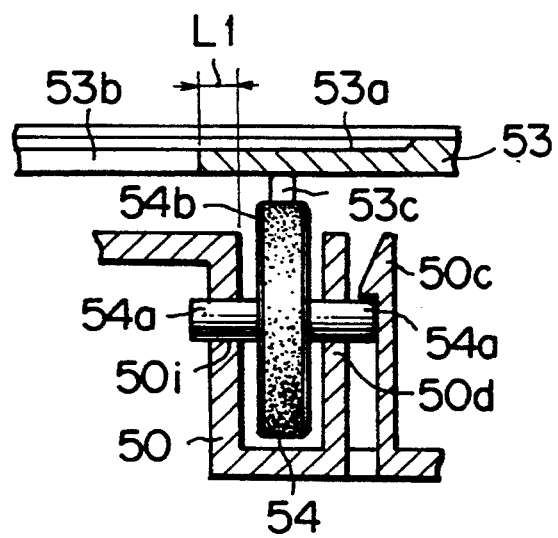
FIG. 18 is a cross-sectional view taken along the line XVIII—XVIII of FIG. 17.
Figure 19:
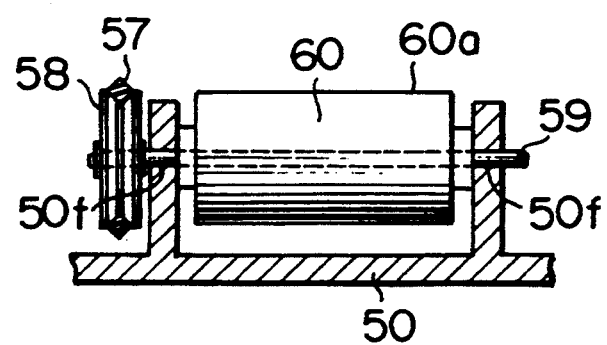
FIG. 19 is a cross-sectional view taken along the line IXX—IXX of FIG. 17.

FIGS. 16A and 16B are detailed views of a close lock gear in a disk loading device of the second embodiment of the invention.

Referring to FIGS. 16A and 16B, in a gear 33*d* of the close lock gear 33, only a tooth bottom 33*j* adjacent to a corner tooth 33*e* is shallower than the other tooth bottoms. A cushion rubber 36 mounted on the tray base 1 serves as a stopper of the tray base 1 which abuts against the front end of the slide portion 5*a* of the mechanism base 5 to properly keep the pitch of meshing between the gear 33*d* of the close lock gear 33 and the teeth 25*b* of the drive gear 25. A hole 36*a* is formed in the cushion rubber 36.

The construction other than the above-mentioned arrangement is the same as in the first embodiment, and therefore explanation thereof is omitted here.

The operation of the disk loading device of the above construction will now be described. When an instruction is given for bringing the tray base 1 and the rotary tray 8 into the inside of the panel 3 (i.e., the disk reception position) from the disk attachment/detachment position shown in FIGS. 6B and 15E and indicated by (A) in FIG. 14, the condition of FIG. 15C is obtained by the same operation as described above in the first embodiment.

Then, the cushion rubber 36 mounted on the tray base 1 abuts against the front end of the slide portion 5*a* of the mechanism base 5, so that the movement of the tray base 1 in the direction B is finished, and the drive of the drive gear 25 in the direction b shifts from the rack portion 33*b* to the gear 33*d*. As a result, the close lock gear 33 angularly moves in the direction K into the position of FIG. 15B. At this time, since only the tooth bottom 33*j* adjacent to the corner tooth 33*e* of the gear 33*d* of the close lock gear 33 is shallower than the other tooth bottoms, the tooth end 25*d* of the tooth 25*b* of the drive gear 25 is engaged with the tooth bottom 33*j*, so that the pitch of meshing between the gear 33*d* of the close lock gear 33 and the teeth 25*b* of the drive gear 25 is slightly increased. As a result, the cushion rubber 36, which has the hole 36*a* and abuts against the front end of the slide portion 5*a* of the mechanism base 5, is compressed and deformed, so that the tray base 1 is further moved in the direction B by a distance corresponding to the increase of the above meshing pitch, as shown in FIG. 16B.

Then, as described above in the first embodiment, the close lock gear 33 further angularly moves in the direction K together with the undriven drive gear 25 under the influence of the spring 34 after the tooth omission gear 24*b* of the control gear 24 is brought out of mesh with the teeth 25*a* of the drive gear 25. As a result, the engagement between the tooth bottom 33*j* and the tooth end 25*d* of the tooth 25*b* of the drive gear 25 is extinguished; however, the tray base 1 has moved in the direction B by a distance corresponding to the increase of the above meshing pitch, and a gap a (see FIG. 16B) is formed between the arcuate rib 33*f* of the close lock gear 33 and the ring-shaped rib 25*c* of the drive gear 25. Therefore, the load on the shafts of the close lock gear 33 and the drive gear 25 is reduced, and the angular movement of the close lock gear 33 in the direction K can be finished with a smaller urging force of the spring 34. Further, for example, even if the product is slanting downwardly toward the front side, the load on the shafts of the close lock gear 33 and the drive gear 25 is reduced because of the above operation, and the angular movement of the close lock gear 33 in the direction K can be positively finished with the urging force of the spring 34.

Then, as the engagement between the tooth bottom 33*j* of the close lock gear 33 and the tooth end 25*d* of the tooth 25*b* of the drive gear 25 is extinguished, the movement of the tray base 1 in the direction B due to the increase of the above meshing pitch is not effected, and the compressive deformation of the cushion rubber 36 is released, so that the cushion rubber is returned into its initial shape. Therefore, the gap a (FIG. 16B) between the arcuate rib 33*f* of the close lock gear 33 and the ring-shaped rib 25*c* of the drive gear 25 is eliminated, and these two ribs abut against each other, so that the pitch of meshing between the gear 33*d* of the close lock gear 33 and the teeth 25*b* of the drive gear 25 becomes proper. Therefore, no play of the tray base 1 in the direction A–B is produced.

Then, there is obtained the condition of FIG. 15A in which the end of the slot 33*h* of the close lock gear 33 abuts against the pin 1*p* of the tray base 1. This condition is the initial condition (also the disk reception position) shown in FIGS. 6C and 15A and indicated by (B) in FIG. 14.

The operation other than the above is the same as described in the first embodiment, and therefore explanation thereof is omitted.

As described above, in this embodiment, only the tooth bottom 33*j* adjacent to the corner tooth 33*e* of the close lock gear 33 is shallower than the other tooth bottoms, and with this arrangement, when the close lock gear 33 angularly moves in the direction K, the tooth bottom 33*j* abuts against the tooth end 25*d* of the tooth 25*b* of the drive gear 25, so that the pitch of meshing between the gear 33*d* of the close lock gear 33 and the teeth 25*b* of the drive gear 25 is slightly increased. As a result, the cushion rubber 36, which has the hole 36*a* and abuts against the front end of the slide portion 5*a* of the mechanism base 5, is compressed and deformed, so that the tray base 1 is further moved in the direction B by a distance corresponding to the increase of the above meshing pitch.

Then, the close lock gear 33 further angularly moves in the direction K together with the undriven drive gear 25 under the influence of the spring 34 after the tooth omission gear 24*b* of the control gear 24 is brought out of mesh with the teeth 25*a* of the drive gear 25. As a result, the engagement between the tooth bottom 33*j* and the tooth end 25*d* of the tooth 25*b* of the drive gear 25 is extinguishing; however, the tray base 1 has moved in the direction B by a distance corresponding to the increase of the above meshing pitch, and the gap a (see FIG. 16B) is formed between the arcuate rib 33*f* of the close lock gear 33 and the ring-shaped rib 25*c* of the drive gear 25. Therefore, the load on the shafts of the close lock gear 33 and the drive gear 25 is reduced, and the angular movement of the close lock gear 33 in the direction K can be finished with a smaller urging force of the spring 34. Further, for example, even if the product is slanting downwardly toward the front side, the load on the shafts of the close lock gear 33 and the drive gear 25 is reduced because of the above operation, and the angular movement of the close lock gear 33 in the direction K can be positively finished with the urging force of the spring 34.

Further, the cushion rubber 36 having the hole 36*a* is provided at the stopper of the tray base 1 which abuts against the front end of the slide portion 5*a* of the mechanism base 5 to properly keep the pitch of meshing between the gear 33*d* of the close lock gear 33 and the teeth 25*b* of the drive gear 25. With this arrangement, when the tray base 1 moves in the direction B in accordance with the increase of the pitch of meshing between the gear 33d of the close lock gear 33 and the teeth 25b of the drive gear 25 (which increase is produced by the engagement between the tooth bottom 33j of the close lock gear 33 and the tooth end 25d of the tooth 25b of the drive tooth 25), the cushion rubber 36 is compressed and deformed, thereby preventing an excessive load from being applied. Further, when the engagement between the tooth bottom 33j of the close lock gear 33 and the tooth end 25d of the tooth 25b of the drive gear 25 extinguishes, so that the movement of the tray base 1 in the direction B due to the increase of the above meshing pitch does not occur, the cushion rubber 36 is returned into its initial shape. Therefore, the gap a (FIG. 16B) between the arcuate rib 33f of the close lock gear 33 and the ring-shaped rib 25c of the drive gear 25 is eliminated, and these two ribs abut against each other, so that the pitch of meshing between the gear 33d of the close lock gear 33 and the teeth 25b of the drive gear 25 becomes proper. Therefore, the tray base 1 is prevented from having a play in the direction A–B.

As described above, in the present invention, the movement of the disk playing portion between the reproducing position and the non-reproducing position, the movement of the tray base in the forward-backward direction in the non-reproducing position of the disk playing portion, and the movement of the tray base in the forward-backward direction in the reproducing position of the disk playing portion are effected by the single motor by switching the power transmission, using the tooth omission gears each having teeth removed over a certain range. The lock gear for preventing the forward-backward movement of the tray base when the tray base is in the disk reception position is provided, and the lock gear having means for limiting the position of entry of the end tooth of the tooth omission gear into the teeth of its mating gear is provided. With this construction, the number of the motors and the drive systems thereof is not increased, and another disk can be exchanged or taken out while one disk is played, and the number of the component parts is small, and a compact design is achieved, and the operation is stabilized.

The lock gear has the rib concentric with the gear portion thereof, and when this gear portion is meshed with its mating gear having the rib concentric with the gear portion thereof, the rib of the lock gear abuts against the rib of the mating gear to properly keep the pitch of meshing between these two gears. With this arrangement, the lock gear can necessarily be rotated to the specified position, thereby stabilizing the operation.

The end tooth of the rack portion of the lock gear and the end tooth of the rack of the tray base are disposed on a common line, and overlap each other generally in a plane, and one side of the end tooth of the rack of the tray base is removed. With this arrangement, even if the end tooth of the rack of the tray base is slightly displaced from the end tooth of the rack portion of the lock gear, the operation can be effected stably.

The lock gear has the gear portion which is so designed that the pitch of meshing between the gear portion of the lock gear and its mating gear is slightly larger adjacent to the corner tooth of the gear portion of the lock gear. With this arrangement, the loads exerted on the shafts of the lock gear and the mating gear are reduced, and the lock gear can be necessarily rotated to the predetermined position even with a smaller urging force of the spring, thereby achieving the stable operation.

The lock gear has the gear portion which is so designed that the pitch of meshing between the gear portion of the lock gear and its mating gear is slightly larger adjacent to the corner tooth of the gear portion of the lock gear, and the resilient member is provided on the stopper which defines the position of stop of the tray base. With this arrangement, an excessive load is prevented when the pitch of meshing between the gear portion of the lock gear and the mating gear is slightly increased, and a play of the tray base in the forward-backward direction is prevented from developing after the operation is finished.

What is claimed is:

1. A disk loading device comprising:

a casing;

a rotary tray on which a plurality of disks can be placed, said rotary tray being rotatable together with the disks;

rotary tray drive means for rotating said rotary tray;

a tray base supporting said rotary tray and said rotary tray drive means, said tray base being movable in a forward-backward direction between a disk attachment/detachment position in which at least one of the disks is disposed outside said casing and a disk reception position where the disks are received within said casing, said tray base having a rack formed thereon;

a disk playing portion for carrying one of the disks which is to be played, said disk playing portion being movable between a reproducing position where the one of the disks to be played is played and a nonreproducing position; and tray base moving means for moving said disk playing portion between said reproducing position and said non-reproducing position, moving said tray base in said forward-backward direction when said disk playing portion is in said non-reproducing position of said disk playing portion, and moving said tray base in said forward-backward direction when said disk playing portion is in said reproducing position, said tray base moving means comprising:

a tooth omission gear and a mating gear which are mated to transfer power selectively from a single motor to said disk playing portion and said rack on said tray base, said tooth omission gear having teeth removed over a certain range to define an end tooth; and a lock gear for preventing forward-backward movement of said tray base when said tray base is in said disk reception position, said lock gear having (i) a rack portion continuous to said rack on said tray base and (ii) a gear portion, said rack portion and said gear portion meeting at an angle of about 90 degrees to define a corner tooth, said lock gear further comprising means for limiting a position of entry of said end tooth of said tooth omission gear into teeth of said mating gear; and wherein said lock gear is rotatable into a predetermined position responsive to a pull of a spring after said tray base has moved to said disk reception position.

2. A disk loading device according to claim 1, in which said lock gear has a rib concentric with said gear portion thereof and in which said mating gear has a rib concentric with a gear portion of said mating gear, and in which, when said gear portion of said lock gear is meshed with said gear portion of said mating gear, said rib of said lock gear abuts against said rib of said mating gear to properly keep a pitch of meshing between said lock gear and said mating gear.

3. A disk loading device according to claim 1, in which an end tooth of said rack portion of said lock gear and an end tooth of said rack of said tray base are disposed on a common line, and overlap each other generally in a plane, and one side of the end tooth of said rack of said tray base is removed.

4. A disk loading device according to claim 1, in which said gear portion of said lock gear is so designed that a pitch of meshing between said gear portion of said lock gear and said mating gear is slightly larger adjacent to said corner tooth than elsewhere on said gear portion.

5. A disk loading device according to claim 1, in which said gear portion of said lock gear is so designed that a pitch of meshing between said gear portion of said lock gear and said mating gear is slightly larger adjacent to said corner tooth than elsewhere on said gear portion, and in which said disk loading device further comprises a stopper which defines a position of stop of said tray base, said stopper having a resilient member provided thereon.

6. A disk loading device according to claim 1, in which said mating gear has a portion which is meshed with said lock gear when said tray base is in said disk reception position.

7. A disk loading device according to claim 6, in which said means for limiting comprises means for preventing said rotating means from pulling said lock gear past said predetermined position, thereby holding said mating gear in place when said lock gear is held in said predetermined position by said spring.

8. A disk loading device according to claim 7, in which said lock gear has a rotation prevention slot formed therein, and in which said means for preventing comprises a pin on said tray base which engages with said rotation prevention slot.

9. A disk loading device according to claim 6, in which said portion of said mating gear which is meshed with said lock gear is also meshed with said rack on said tray base when said tray base is in said disk reception position, thereby holding said tray base in place when said tray base is in said disk reception position.

10. A disk loading device according to claim 1, further comprising a second lock gear having a (i) second rack portion continuous to said rack on said tray base and (ii) a second gear portion, said second rack portion and said second gear portion meeting at about 90 degrees to define a second corner tooth, said lock gear and said second lock gear being mounted on opposite ends of said tray base.

11. A disk loading device according to claim 10, in which, when said tray base moves from said disk reception position to said disk attachment/detachment position, said mating gear engages successively with said gear portion of said lock gear, said corner tooth of said lock gear, said rack portion of said lock gear, said second rack portion of said second lock gear, said second corner tooth of said second lock gear and said second gear portion of said second lock gear.

12. A disk loading device according to claim 1, in which, when said tray base moves from said disk reception position to said disk attachment/detachment position, said mating gear engages successively with said gear portion of said lock gear, said corner tooth of said lock gear and said rack portion of said lock gear.

* * * * *